Oct. 20, 1936.                J. C. HOBBS                2,058,240
GAS AND LIQUID SEPARATING APPARATUS
Original Filed Dec. 9, 1932
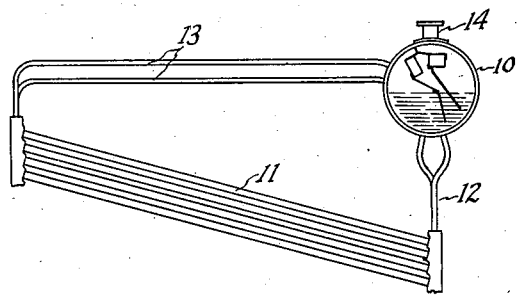
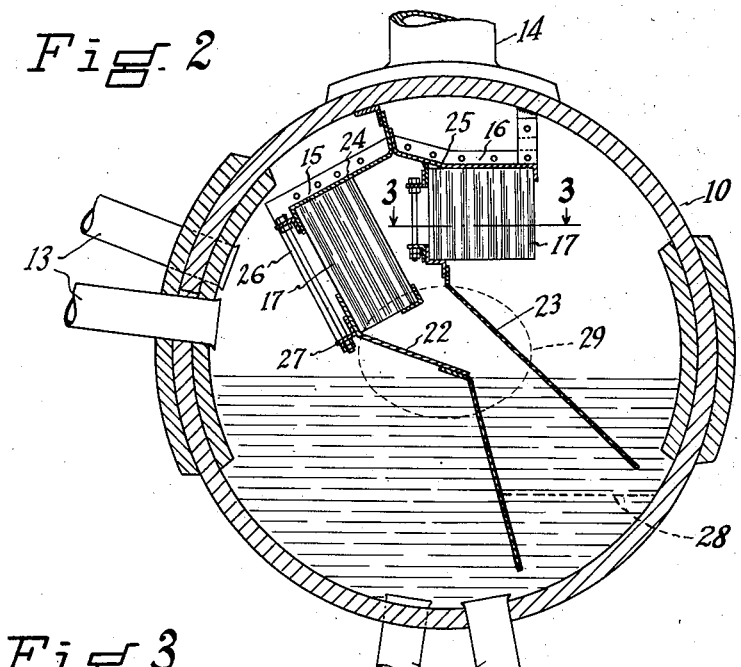
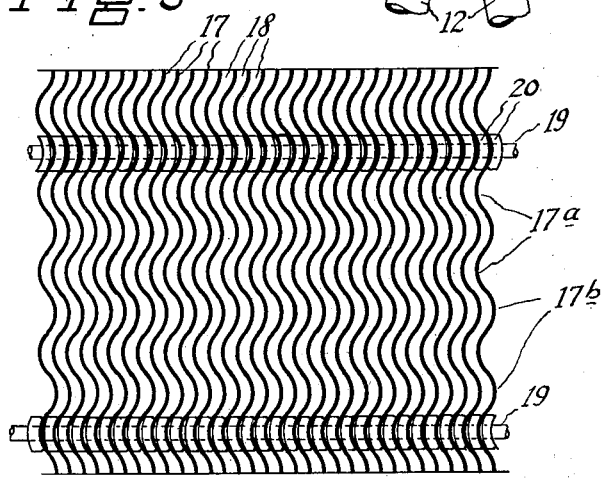
INVENTOR
James C. Hobbs
ATTORNEY Patented Oct. 20, 1936

2,058,240

UNITED STATES PATENT OFFICE 2,058,240

GAS AND LIQUID SEPARATING APPARATUS

James C. Hobbs, Painesville, Ohio

Application December 9, 1932, Serial No. 646,453
Renewed August 6, 1936

25 Claims. (Cl. 122—491)

The present invention relates in general to the construction and mode of operation of fluid separators and more particularly to fluid separators adapted for use in a boiler steam and water drum for the removal of moisture and other impurities in the steam generated before leaving the drum.

The production of clean dry steam is highly desirable in modern steam boilers to avoid deposits in the associated superheater and/or turbine. The circulating boiler water normally contains a high concentration of solids for the purpose of preventing internal corrosion of the pressure parts by corrosive constituents of the water. Small particles of the solid material are present in suspension or solution in the moisture carried by the steam entering the boiler steam and water drum, and unless removed from the steam before its exit from the drum, would deposit in the superheater and/or associated turbine. Priming and foaming in the steam and water drum increase the amount of moisture and solid material tending to pass out with the steam.

Substantially all separator constructions heretofore proposed for use in a steam and water drum have been based on the inertia principle of fluid separation, and usually comprise a series of U-shaped baffles arranged to receive the impact of the steam and water mixture entering the drum and causing several abrupt changes in direction of flow of the mixture. Separators operating under this principle have been found ineffective particularly at high boiler loads as the moisture in the mixture striking the separator baffles at a high velocity is caused to spatter and a substantial portion of the divided particles is again picked up by the steam deflected by the baffle, and the action repeated in subsequent baffle contacts. An undesirable high pressure drop normally occurs in all such arrangements. The proponents of this type of separator have not appreciated the fact that the energy stored in a given stream of fluid is proportional to the square of its velocity, and that this energy is available for carrying moisture particles.

In accordance with my present invention, the wet steam at a relatively low velocity, is passed along and in intimate contact with a large area of moisture collecting surface, and the steam and water separated principally by adhesion of the moisture particles to the wet collecting surface. The direction of flow of the steam is changed during its contact with the surface only enough to create sufficient turbulence to bring substantially all portions of the steam into contact with the collecting surface during its passage thereby. The collecting surface is advantageously arranged to provide a gravity flow of the separated moisture as collected out of the path of steam flow, with little or no intermingling of the moisture collecting on adjacent portions of the surface. Plate separators of the zig-zag type have heretofore been proposed, in which the property of adhesion was theoretically utilized for the separation of the liquid from the gas stream, but in those constructions the gas and liquid mixture was subjected to such relatively abrupt changes in direction that much of the separated liquid was swept off the plate surfaces and reatomized by impinging on subsequent surface portions, thereby preventing effective separation of the liquid particles at high velocities and creating prohibitive pressure drops in the separator. No adequate provision was made for the removal of the separated moisture. A further disadvantage was the relatively high cost of construction of such separators.

The general object of my invention is the provision of a fluid separator which is characterized by its effectiveness in operation, compactness and simplicity of construction. A further and more specific object is the provision of a steam and water drum separator capable of producing dry steam at high boiler loads and varying drum water levels, and affording adequate accessibility to the portions of the drum requiring periodic inspection and/or repairs. A further specific object is the provision of an improved method of producing dry steam.

The various features of novelty which characterize my invention are pointed out with particularity in the claims annexed to and forming a part of this specification. For a better understanding of the invention, its operating advantages and specific objects attained by its use, reference should be had to the accompanying drawing and descriptive matter in which I have illustrated and described a preferred embodiment of my invention.

Of the drawing:

Fig. 1 is a fragmentary conventional illustration of a steam boiler incorporating a preferred embodiment of my invention;

Fig. 2 is an enlarged view of the steam and water drum shown in Fig. 1; and

Fig. 3 is a section on the line 3—3 of Fig. 2.

In the drawing, a preferred embodiment of the invention is illustrated as incorporated in a steam and water dum 10 of a water tube boiler of the Babcock & Wilcox cross drum type. A fluid circulation is maintained between the drum 10 and a bank of steam generating tubes 11 through downcomers 12 connected to the bottom of the drum 10, and steam and water circulators 13 extend between the upper end of the tube bank and one side of the drum and open thereto above the normal water level therein.

With the foregoing arrangement wet steam will be discharged from the circulators 13 substantially horizontally into the steam space of the drum 10, and the separating provisions of my invention are arranged for a flow of the wet steam therethrough before leaving the drum through one or more steam outlets 14. The steam and water separating provisions comprise a primary unit or section 15 and a secondary unit or section 16, the primary section being arranged in the path of flow of the wet steam leaving the circulators, and the secondary section being positioned in the path of flow between the primary section and the dry steam outlet 14. Each separator section is formed by a series of closely spaced corrugated vertical plates 17 arranged side-by-side longitudinally of the drum, and forming a series of narrow sinuous or laterally undulating channels 18 extending transversely of the drum. The plates 17 are continuously curved to form a series of shallow corrugations 17$^a$ having reversely curved connecting portions 17$^b$, and with the plates uniformly spaced apart and adjacent plates slightly nested to provide only sufficient turbulence in the fluid mixture to bring substantially all portions of the mixture into contact with the relatively smooth moisture collecting surfaces formed by the plates during its passage therebetween. The plates in each section are assembled on rods 19, with curved spacer members 20 between each pair of adacent plates. The vertical arrangement of the plate corrugations facilitates the gravity flow of the moisture collecting on the plate surfaces out of the path of the mixture. The lower ends of the channels 18 are open to permit the separated moisture to drop onto the rear side of inclined seal plates 22 and 23, which close the spaces between the lower front corners of the separator sections and the water in the drum. The sections are suitably supported from the upper side of the drum and the seal plates carried by bolts 26 and angle bars 27. Access openings 29 in the ends of the drum afford entrance to the interior for inspection and/or repairs.

The top side of the primary section is closed by a plate 24, the rear portion of which is extended into engagement with a top closing plate 25 of the secondary section. The primary section is preferably inclined with its lower end nearer the center of the drum. This arrangement increases the accessibility of the portion of the drum interior to which the circulators are connected and utilizes the velocity and gravital components of the water particles separating out on the moisture collecting surfaces of that section to provide a downward flow in each corrugated portion with little or no intermingling of the moisture separated on adjacent corrugated portions. The separator extends longitudinally in the drum to the limits of the circulator row. End plates 28 prevent entry into the portion of the steam space at the rear of the separator, forcing all of the steam to pass through the separators before reaching the steam outlet 14.

The effective inlet and outlet areas of the channels 18 of each section are advantageously proportioned to provide a reduction in velocity of discharge below the value at which the inertia of the fluid is greater than the force of adhesion between the separated moisture and plate surfaces, so that little or none of the moisture once separated is picked up by the fluid subsequently sweeping that surface. For this purpose the top closing plate and seal plate of each section are extended along the inlet side of each section, as shown in Fig. 2, to reduce the effective inlet area of the channels.

It will be noted that the submerged portions of the seal plates 22 and 23 extend to points slightly spaced from the drum wall beyond the points of connection of the downcomers 12. This seal plate arrangement minimizes the formation of eddy currents in the water at the rear of the plates due to the passage of steam bubbles below the surface of the liquid subsequently rising to the surface. Such eddy currents tend to throw up sprays of water, which may be picked up by the steam passing out of the secondary section and carried directly to the steam outlet 14. The possibility of such occurrences increases when higher water levels are carried in the drum.

With the separator constructed and arranged as described, the wet steam enters the drum substantially horizontally, the velocity being decreased in view of the greater cross-sectional flow area of that portion of the drum as compared with the total area of the circulator tubes. The wet steam enters the primary separator section in a plurality of thin parallel streams, each of which passes through the laterally undulating flow path defined by a pair of adjacent plates. During the passage of the wet steam through the channels substantially all portions are brought into contact with the surfaces of the plates by the slight turbulence effected by the sinuosity of the channel. The wet plates furnish a large area of contact for the wet steam and the moisture therein tends to adhere to the plate surfaces. The moisture as collected on the plates flows downwardly along the corresponding corrugations onto the seal plates and drops into the pool of water in the bottom of the drum. The use of smooth shallow corrugations avoids abrupt changes in direction of the flow, but causes sufficient change to maintain a turbulence sufficient to bring substantially all particles of moisture carried by the steam into contact with the collecting surfaces within the available distance. The limited turbulent effect and the reduced discharge velocity in each section prevent the separated moisture from being picked up by subsequent portions of the mixture. The major portion of the steam and water separation will be effected in the primary section and completed in the secondary section. The spaced arrangement of the sections provides a flow equalization chamber therebetween. The arrangement of the inlet to the secondary section above the bottom of the primary outlet reduces the amount of contact between the separated moisture and subsequent portions of the mixture. Due to the sealing plate arrangement, the dry steam leaving the secondary section will pass through a velocity reducing space between the secondary section and the drum outlet in which the water is quiescent.

By way of example, and not of limitation, I have found that a highly effective separation is attained with both the primary and secondary sections formed by thin metallic plates having corrugations 1¼" in width and ¼" deep, and the plates uniformly spaced $\frac{3}{32}$" apart, with the plates of the primary section 13" x 6" and of the secondary section 8⅜" x 10". With such dimensions and arranged as shown, the flow area in the secondary section will be somewhat less than in the primary section. In view of the higher quality of the steam entering that section, a higher velocity of the mixture therethrough is permissible. Obviously, the proportions of the separation occurring in the respective sections may be varied to some extent by substituting a unit having a different plate spacing and size of corrugations for those shown, and under certain conditions the plates in the primary section are desirably further spaced apart and formed with wider and fewer corrugations, thereby further reducing the pressure drop in the separator.

While in accordance with the provisions of the statutes I have illustrated and described herein the best form of my invention now known to me, those skilled in the art will understand that changes may be made in the form of the apparatus disclosed without departing from the spirit of the invention covered by my claims, and that certain features of my invention may sometimes be used to advantage without a corresponding use of other features. While the invention has been specifically described as used for separating moisture from steam, it is equally adapted for separating other liquids from gases or vapors, such as gasoline from natural gas, water from air, or chemicals from vapors.

I claim:

1. A gas and liquid separator comprising a plurality of side-by-side liquid collecting plates arranged to form narrow channels therebetween, each of said plates being continuously curved in a series of vertically extending relatively shallow corrugations of uniform curvature extending at an angle to the general direction of flow through said channels, the corrugations of adjacent plates being relatively arranged to form continuously undulating channels, and means for conducting separated liquid out of the path of gas flow.

2. A gas and liquid separator comprising a plurality of side-by-side liquid collecting plates arranged to form narrow channels therebetween, each of said plates being continuously curved in a series of vertically extending relatively shallow corrugations of uniform curvature extending transversely of the general direction of flow through said channels, the corrugations of adjacent plates being relatively arranged to form undulating channels of substantially unvarying cross-sectional area, adjacent plates being spaced apart a distance not greater than the depth of said corrugations, and means for conducting separated liquid out of the path of gas flow.

3. A gas and liquid separator comprising a plurality of side-by-side liquid collecting plates arranged to form narrow channels therebetween, each of said plates being continuously curved in a series of vertically extending corrugations of uniform curvature extending transversely of the general direction of flow through said channels and having a width several times greater than depth, the corrugations of adjacent plates being relatively arranged to form continuously undulating channels of substantially unvarying cross-sectional area and adjacent plates being spaced apart a distance not greater than the depth of said corrugations, means for holding said plates in said spaced relation, and means for conducting separated liquid out of the path of gas flow.

4. A gas and liquid separator comprising a plurality of side-by-side liquid collecting plates of substantially rectangular form arranged to form narrow channels therebetween, each of said plates being continuously curved in a series of relatively shallow corrugations extending transversely of the general direction of flow through said channels, the corrugations of adjacent plates being relatively arranged to form undulating channels and adjacent plates being spaced apart a distance substantially the same as the depth of said corrugations, means associated with said plates providing an effective channel outlet area greater than the effective inlet area thereof, and means for conducting separated liquid out of the path of gas flow.

5. In a steam and water drum having steam and water circulators connected thereto along one side thereof, downcomers connected to the bottom thereof, and a steam outlet in its upper side, a baffle plate extending from the drum wall intermediate said circulators and outlet to a level below the normal water level in said drum and having an opening therein above the normal water level, and a separator positioned in said opening and comprising a plurality of side-by-side plates arranged to form narrow channels therebetween, each of said plates being formed with a series of relatively shallow corrugations extending transversely of the general direction of flow between said circulators and outlet and inclined towards said circulators at an angle substantially corresponding to the vector resultant of the gravity and velocity components of the moisture carried by the steam entering said separator, and the corrugations of adjacent plates being relatively arranged to form undulating channels.

6. In a steam and water drum having steam and water circulators connected thereto along one side thereof, downcomers connected to the bottom thereof, and a steam outlet in its upper side, a baffle plate extending from the drum wall intermediate said circulators and outlet to a level below the normal water level in said drum and having an opening therein above the normal water level, and a separator positioned in said opening and comprising a plurality of side-by-side plates arranged to form narrow channels therebetween, each of said plates being continuously curved in a series of relatively shallow corrugations extending transversely of the general direction of flow between said circulators and outlet, and the corrugations of adjacent plates being relatively arranged to form continuously undulating channels of substantially unvarying cross-sectional area and adjacent plates being spaced apart a distance substantially the same as the depth of said corrugations.

7. In a steam and water drum having steam and water circulators connected thereto along one side thereof, downcomers connected to the bottom thereof, and a steam outlet in its upper side, a baffle plate extending from the drum wall intermediate said circulators and outlet to a level below the normal water level in said drum and having an opening therein above the normal water level, and a separator positioned in said opening and comprising a plurality of side-by-side plates arranged to form narrow channels therebetween, each of said plates being continuously curved in a series of relatively shallow corrugations extending obliquely to the flow through said channels and inclined towards said circulators, the corrugations of adjacent plates being relatively arranged to form undulating channels.

8. In a steam and water drum having steam and water circulators connected thereto along one side thereof and above the normal water level therein, downcomers connected to the bottom thereof, and a steam outlet in its upper side, a primary separator section arranged adjacent said circulators and receiving the wet steam discharge therefrom, and a secondary separator section positioned between said primary section and steam outlet and comprising a plurality of side-by-side plates arranged to form narrow channels therebetween, each of said plates being continuously curved in a series of relatively shallow corrugations extending transversely of the general direction of flow between said primary section and steam outlet, the corrugations of adjacent plates being relatively arranged to form undulating channels, and means including a water sealed baffle extending downwardly from the front side of said primary section for providing a steam flow successively through said primary and secondary sections.

9. In a steam and water drum having steam and water circulators connected thereto along one side thereof and above the normal water level therein, downcomers connected to the bottom thereof, and a steam outlet in its upper side, a primary separator section arranged adjacent said circulators and receiving the wet steam discharge therefrom, a secondary separator section positioned between said primary section and steam outlet, each of said separator sections comprising a plurality of side-by-side corrugated plates arranged to form narrow channels therebetween with a series of relatively shallow corrugations extending transversely of the general direction of flow therein, and means providing a steam flow successively through said primary and secondary sections including a seal plate extending from the bottom of said primary section to below the normal water level in said drum and having a submerged portion terminating at one side of said downcomer connections.

10. In a steam and water drum having steam and water circulators connected thereto along one side thereof and above the normal water level therein, downcomers connected to the bottom thereof, and a steam outlet in its upper side, a primary separator section arranged adjacent said circulators and receiving the wet steam discharge therefrom, and a secondary separator section positioned between said primary section and steam outlet comprising a plurality of side-by-side corrugated plates arranged to form narrow channels therebetween with a series of relatively shallow corrugations extending transversely of the general direction of flow therein, and means providing a steam flow successively through said primary and secondary sections including a seal plate extending downwardly from the bottom of said secondary section to below the normal water level in said drum terminating at a point providing a drain passage between said plate and drum.

11. The method of separating out finely divided liquid particles carried in suspension in a gas which comprises dividing a stream of the liquid-laden gas into a multiplicity of relatively thin streams, passing each of said thin streams through a separate smooth uniformly sinuous path of flow of uniform flow area between wet liquid collecting surfaces with substantially no increase in velocity and without impinging on any collecting surface at an abrupt angle and with only sufficient turbulence to bring substantially all portions of the stream into intimate contact with said surfaces during its passage therebetween, and conducting the liquid as collected on said surfaces out of said paths of flow by gravity.

12. The method of producing dry steam which comprises dividing a stream of moisture-laden steam into a multiplicity of relatively thin streams, passing each of said thin streams through a separate smooth uniformly sinuous path of flow of uniform flow area between wet moisture collecting surfaces without impinging on any collecting surface at an abrupt angle and with only sufficient turbulence to bring substantially all portions of the stream into intimate contact with said surfaces during its passage therebetween, and conducting the moisture collecting on said surfaces out of said paths of flow.

13. The method of producing dry steam which comprises dividing a stream of moisture-laden steam into a multiplicity of relatively thin streams, passing said thin streams through smooth sinuous paths of flow between wet moisture collecting surfaces at progressively decreasing velocities and without impinging on any collecting surface at an abrupt angle and with only sufficient turbulence to bring substantially all portions of the streams into intimate contact with said surfaces, and conducting the moisture as collected on said surfaces out of said paths of flow by gravity.

14. Gas and liquid separating apparatus comprising a horizontally arranged casing constructed to maintain a pool of liquid in the lower part thereof and having a connection at one side thereof for the entry of a wet gas, a liquid outlet in the lower part thereof, and a dry gas outlet in its upper side, a gas and liquid separator in said casing intermediate said wet gas inlet and said dry gas outlet and at a level above the normal liquid level in said casing and comprising a plurality of side-by-side liquid collecting plates, each of said plates being formed with a series of relatively shallow corrugations of uniform curvature extending transversely of the general direction of gas flow between said inlet and said outlet, and the corrugations of adjacent plates being relatively arranged to form narrow undulating channels therebetween.

15. Gas and liquid separating apparatus comprising a horizontally arranged casing constructed to maintain a pool of liquid in the lower part thereof and having a connection at one side thereof for the entry of a wet gas, a liquid outlet in the lower part thereof, and a dry gas outlet in its upper side, a gas and liquid separator in said casing intermediate said wet gas inlet and said dry gas outlet and at a level above the normal liquid level in said casing and comprising a plurality of side-by-side liquid collecting plates, each of said plates being formed with a series of relatively shallow corrugations of uniform curvature extending transversely of the general direction of gas flow between said inlet and said outlet, the corrugations of adjacent plates being relatively arranged to form narrow continuously undulating channels therebetween of substantially uniform cross-sectional area, and adjacent plates being spaced apart a distance not greater than the depth of said corrugations.

16. Gas and liquid separating apparatus comprising a horizontally arranged casing constructed to maintain a pool of liquid in the lower part thereof and having a connection at one side thereof for the entry of a wet gas, a liquid outlet in the lower part thereof, and a dry gas outlet in its upper side, a gas and liquid separator in said casing intermediate said wet gas inlet and said dry gas outlet and at a level above the normal liquid level in said casing and comprising a plurality of substantially rectangular side-by-side liquid collecting plates, each of said plates being formed with a series of relatively shallow corrugations extending transversely of the general direction of gas flow between said inlet and said outlet, the corrugations of adjacent plates being relatively arranged to form narrow continuously undulating channels therebetween and adjacent plates being spaced apart a distance substantially the same as the depth of said corrugations, and means associated with said plates providing an effective channel outlet area greater than the effective inlet area thereof.

17. In a steam and water drum having a dry steam outlet in the upper part thereof and a series of wet steam inlets opening thereto along one side thereof, a steam and water separator extending longitudinally of said drum and positioned in the path of steam flow between said wet steam inlets and said dry steam outlet and comprising a series of parallel inclined substantially rectangular corrugated plates with the corrugations thereof extending at an angle to the direction of steam flow through the separator substantially corresponding to the vector resultant of the gravity and velocity components of the moisture in the steam, whereby any separated moisture will tend to flow downwardly along and parallel to the corrugations of said plates.

18. Gas and liquid separating apparatus comprising a series of corrugated liquid separating plates spaced to form gas flow channels therebetween with the corrugations of said plates extending at an angle substantially corresponding to the vector resultant of the gravity and velocity components of the liquid particles carried by the gas entering said channels, whereby liquid separating on said plates will tend to flow downwardly along and parallel to said corrugations.

19. Gas and liquid separating apparatus comprising a series of corrugated liquid separating plates spaced to form gas flow channels therebetween with the corrugations of each plate extending parallel to the gas inlet edge of said plate and said plates being arranged with their inlet edges inclined at an angle substantially corresponding to the vector resultant of the gravity and velocity components of the liquid particles carried by the gas entering said channels, whereby liquid separating on said plates will tend to flow downwardly along and parallel to said corrugations.

20. A gas and liquid separator comprising a plurality of side-by-side liquid collecting plates arranged to form narrow channels therebetween, each of said plates being continuously curved in a series of vertically extending relatively shallow corrugations of uniform curvature extending at an angle to the general direction of flow through said channels, the corrugations of adjacent plates being relatively arranged to form continuously undulating channels, means associated with said plates providing an effective channel inlet area less than the effective outlet area thereof, and means for conducting separated liquid out of the path of gas flow.

21. A gas and liquid separator comprising a plurality of side-by-side liquid collecting plates of rectangular form arranged to form flow channels therebetween, each of said plates being continuously curved in a series of vertically extending corrugations of uniform curvature extending transversely of the general direction of flow through said channels, the corrugations of adjacent plates being relatively arranged to form continuously undulating channels, a plate closing the upper ends of said channels, and means for conducting separated liquid from the bottoms of said channels.

22. Gas and liquid separating apparatus comprising a casing constructed to maintain a pool of liquid in the lower part thereof and having a gas space above said liquid pool, a gas outlet from said gas space, a primary separator section arranged in said gas space in the path of gas flow to said gas outlet, a secondary separator section positioned in said gas space in the path of gas flow between said primary section and said gas outlet, each of said separator sections comprising a plurality of side-by-side liquid separating plates arranged to form relatively narrow gas channels therebetween, and the plates in said primary and secondary sections being relatively proportioned and spaced to provide a smaller effective flow area through said secondary section than through said primary section.

23. Gas and liquid separating apparatus comprising a casing constructed to maintain a pool of liquid in the lower part thereof and having a gas space above said liquid pool, a gas outlet from said gas space, a primary separator section arranged in said gas space in the path of gas flow to said gas outlet, a secondary separator section positioned in said gas space in the path of gas flow between said primary section and said gas outlet, each of said separator sections comprising a plurality of rectangular liquid separating plates arranged side-by-side to form narrow channels therebetween, each of said plates being continuously curved in a series of corrugations extending transversely of the general direction of flow through said channels, and the plates in said primary and secondary sections being relatively dimensioned to provide a smaller effective flow area through said secondary section than through said primary section.

24. In a steam and water drum having steam and water circulators connected thereto along one side thereof, and a steam outlet in its upper side, a baffle plate structure extending from the drum wall intermediate said circulators and outlet to a level below the normal water level in said drum and having an opening therein above the normal water level, and a steam and water separator positioned in said opening and comprising a plurality of side-by-side plates arranged to form narrow channels therebetween, each of said plates being formed with a series of corrugations extending transversely of the general direction of flow between said circulators and outlet, and the corrugations of adjacent plates being relatively arranged to form undulating channels.

25. In a steam and water drum having steam and water circulators connected thereto along one side thereof, and a steam outlet in its upper side, a baffle plate structure extending from the drum wall intermediate said circulators and outlet to a level below the normal water level in said drum and having an opening therein above the normal water level, and a steam and water separator positioned in said opening and comprising a row of moisture-collecting plates arranged side-by-side and spaced to form narrow elongated steam flow channels between moisture collecting surfaces thereof.

JAMES C. HOBBS.